(12) United States Patent
Nakamura

(10) Patent No.: US 8,467,608 B2
(45) Date of Patent: Jun. 18, 2013

(54) METHOD AND APPARATUS FOR CHARACTER STRING RECOGNITION

(75) Inventor: Hiroshi Nakamura, Nagano (JP)

(73) Assignee: Nidec Sankyo Corporation (JP)

( * ) Notice: Subject to any disclaimer, the term of this patent is extended or adjusted under 35 U.S.C. 154(b) by 1118 days.

(21) Appl. No.: 12/059,390

(22) Filed: Mar. 31, 2008

(65) Prior Publication Data

US 2008/0240582 A1    Oct. 2, 2008

(30) Foreign Application Priority Data

Mar. 30, 2007    (JP) .................................. 2007-92072

(51) Int. Cl.
 *G06K 9/34* (2006.01)
(52) U.S. Cl.
 USPC ........... 382/177; 382/174; 382/179; 382/292; 382/321; 382/323
(58) Field of Classification Search
 USPC ......... 382/100–102, 112, 114, 168, 170–174, 382/176, 177, 179, 229, 291, 292, 309, 310, 382/311, 317, 321, 323
 See application file for complete search history.

(56) References Cited

U.S. PATENT DOCUMENTS

| 4,562,594 | A | * | 12/1985 | Bednar et al. | 382/174 |
| 5,034,991 | A | * | 7/1991 | Hagimae et al. | 382/209 |
| 5,253,304 | A | * | 10/1993 | LeCun et al. | 382/102 |
| 5,321,768 | A | * | 6/1994 | Fenrich et al. | 382/178 |
| 5,825,920 | A | * | 10/1998 | Kitamura et al. | 382/178 |
| 6,115,497 | A | * | 9/2000 | Vaezi et al. | 382/174 |
| 6,535,619 | B1 | * | 3/2003 | Suwa et al. | 382/101 |
| 6,856,697 | B2 | * | 2/2005 | Lee et al. | 382/177 |
| 2004/0255249 | A1 | * | 12/2004 | Chang et al. | 715/723 |

FOREIGN PATENT DOCUMENTS

| JP | 5-73722 | 3/1993 |
| JP | 5-120483 | 5/1993 |
| JP | 2004-46723 | 2/2004 |

* cited by examiner

*Primary Examiner* — Eric Rush
(74) *Attorney, Agent, or Firm* — Cantor Colburn LLP

(57) ABSTRACT

A method and an apparatus for character string recognition may be provided that enables prevention of a decrease in recognition accuracy for a character string even when distortion of an image appears in a direction perpendicular to a medium transfer direction.

3 Claims, 15 Drawing Sheets

FIG. 4

P<JPNSANKYO<<HANAKO<<BCDEFGILMQRTUVWXYZ<<<<<<<
0987654326JPN8503172F1210082<<<<<<<<<<<<<<6

FIG. 12
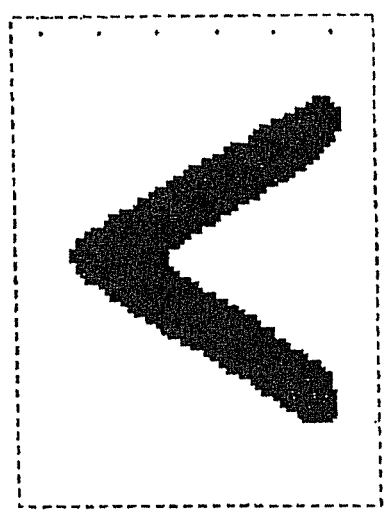
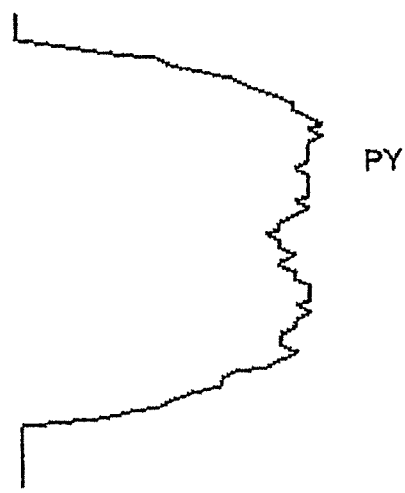
PY
PX

METHOD AND APPARATUS FOR CHARACTER STRING RECOGNITION

The present application claims priority to JP 2007-92072 filed Mar. 30, 2007 under 35 U.S.C. §119, the contents of which are also hereby incorporated herein by reference.

FIELD OF THE INVENTION

The present invention relates to a method and apparatus for character string recognition to be used for optically reading a character string placed on media such as paper and plastic materials, and particularly to such a method and apparatus that enables prevention of a decrease in recognition accuracy.

BACKGROUND

Known conventionally are apparatuses for recognizing a character string printed on a surface of a medium such as a check. For example, Patent Document 1 discloses an apparatus for character recognition that includes: character segmentation means with which a character part is segmented along a circumscribing rectangular frame after detecting the character part from binarized image data; characteristic vector extraction means for extracting characteristic vectors from a character pattern obtained with the character segmentation means; characteristics storage means for storing characteristics data for each character in advance; similarity calculation means for calculating similarity between the characteristic vectors of the entered character pattern and the standard vectors of each character out of the characteristic dictionary; candidate character selection means for selecting a candidate character(s) according to the level of similarity calculated with the similarity calculation means, similar character discrimination means for further recognizing a candidate character when there exist a plurality of candidate characters selected with the candidate character selection means. Such an apparatus for character recognition including those means described above ensures appropriate recognition of a character string printed on a surface of a medium.

Meanwhile, the binarized image data described above is captured by an optical sensor for optically reading a character string printed on the surface of the medium. Specifically, a CCD line sensor (one-dimensional image pickup device) that optically reads a character string in one dimension is mostly used (Refer to Patent Document 2) from the viewpoint of reducing the manufacturing cost. In this case, main scanning for the character string on the medium is carried out by the CCD line sensor while sub-scanning is carried out through transferring the medium by manual operation or mechanical driving. Through interaction between the CCD line sensor and operation of transferring the medium, two-dimensional image data of the character string is captured, and then the two-dimensional image data is binarized to obtain the binarized image data described above.

Furthermore, Patent Document 3 for example discloses a method for character recognition in which appropriate character segmentation can be carried out through character recognition processing by selecting a most likely candidate according to a recognition data verifying score and/or linguistic likelihood even when the characters are not placed at regular intervals.

Patent Document 1
  Japanese Unexamined Patent Publication (Kokai) No. JP5-120483

Patent Document 2
  Japanese Unexamined Patent Publication (Kokai) No. JP5-73722

Patent Document 3
  Japanese Unexamined Patent Publication (Kokai) No. JP2004-46723

However, unfortunately the apparatus for character recognition disclosed in Patent Document 2 may cause a decrease in recognition accuracy.

Specifically, when a medium transfer speed becomes so uncertain due to manual transfer operation (i.e., swiping motion in the case of a swiping-type card reader) as to cause distortion of an image in the medium transfer direction, other distortion of the image may also appear in a direction perpendicular to the medium transfer direction as the transfer operation proceed with (maybe making the image tilted and/or warped). Moreover, detachment of a lower edge part of the medium from a transfer path of the image pickup apparatus (the apparatus for character recognition) may also result in distortion of the image in the direction perpendicular to the medium transfer direction. In such a case, since the image distortion appears in the direction perpendicular to the medium transfer direction, correcting the image is difficult in general. For example, the apparatus for character recognition disclosed in Patent Document 2 enables the distortion of the image to be corrected appropriately as far as the image distortion appears in the medium transfer direction, but any image distortion in the direction perpendicular to the medium transfer direction cannot be corrected easily. As a result, character segmentation using the distorted image, as it is, leads to a decrease in recognition accuracy.

From this viewpoint, enabling appropriate character segmentation even when the characters in an array are not placed at regular intervals, the method for character recognition disclosed in Patent Document 3 may be expected to prevent a decrease in recognition accuracy for a character string. However, the method for character recognition disclosed in Patent Document 3 fundamentally assumes that character intervals and character width are within specified ranges. Therefore, the method cannot cope with an apparatus for character recognition applying manual transfer operation in which the medium transfer speed changes on a large scale at random so that character segmentation becomes uncertain and ensuring a high recognition accuracy is difficult.

SUMMARY OF THE INVENTION

Thus, the present invention may provide a method and apparatus for character string recognition that enables prevention of a decrease in recognition accuracy for a character string even when distortion of an image appears in a direction perpendicular to a medium transfer direction.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 4 shows image data obtained by picking up characters printed in an OCR character memory region (Refer to FIG. 1) of a record data carrier.

FIG. 12 shows image data of "<" included in the character string.

DETAILED DESCRIPTION OF THE PREFERRED EMBODIMENTS

Figure 1:
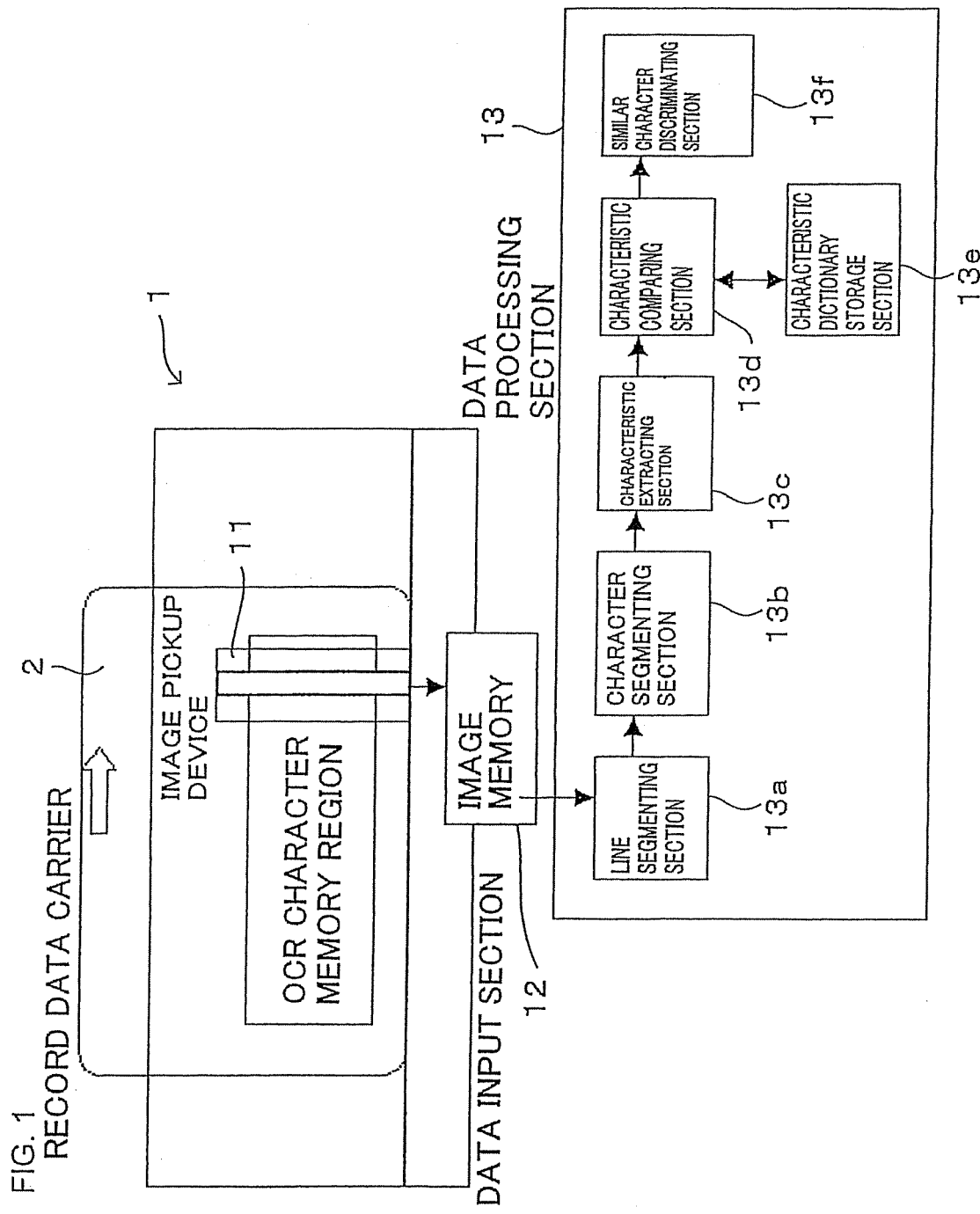
FIG. 1 is a block diagram showing an electrical structure of a character string recognition apparatus in accordance with the embodiment of the present invention.

To solve the problem identified above, the present invention may provide, but is not limited to, the following aspects and/or embodiments.

(1) A method for character string recognition by processing image data obtained through picking up a character string placed on a medium including: a first step of calculating vertical projection data of the image data in a vertical direction perpendicular to a direction of the character string while shifting the image data in the direction of the character string; and a second step of detecting positions exceeding a prescribed threshold value in the vertical projection data obtained through the first step described above as segmentation positions of characters included in the character string; wherein the prescribed threshold value comprises: a first threshold value determined according to the number of pixels existing between both ends of the character string detected by using the vertical projection data; and a second threshold value being one of positive peak values included in the vertical projection data and determined according to the number of characters included in the character string.

According to the present invention; the method for character string recognition may include various steps of; calculating horizontal projection data of the image data in a direction of the character string (a sub-scanning direction of a one-dimensional image scanner) while shifting the image data in a vertical direction perpendicular to the direction of the character string (a main scanning direction of the one-dimensional image scanner), detecting the character string position in a vertical direction according to the horizontal projection data obtained through the above calculation, calculating vertical projection data of the image data in the vertical direction while shifting the image data in the direction of the character string according to the character string position detected through the above, and detecting positions exceeding a prescribed threshold value in the vertical projection data obtained through the above as segmentation positions of characters included in the character string. The prescribed threshold value described above includes the first threshold value determined according to the number of pixels existing between both ends of the character string detected by using the vertical projection data and the second threshold value being one of the positive peak values included in the vertical projection data and determined according to the number of characters included in the character string. Therefore, it becomes possible to prevent a decrease in recognition accuracy for the character string.

Namely, even when distortion of the image appears in a direction perpendicular to the medium transfer direction (as a result, the positive peak values to be detected become small), determining the second threshold value appropriately according to the number of characters included in the character string improves a chance of detecting even small peak values. Therefore, it becomes possible to prevent a decrease in recognition accuracy for the character string. Furthermore, the present invention does not require any such character recognition processing by selecting a most likely candidate according to a recognition data verifying score and/or linguistic likelihood as disclosed by Patent Document 3 described above, but simply require using the second threshold value. Therefore, character segmentation can be carried out appropriately even when the medium transfer speed changes on a large scale at random.

The first threshold value may be any value, as far as the value is determined according to the number of pixels existing between both the ends of the character string detected by using the vertical projection data. For example, if the medium transfer speed is fast, the number of pixels becomes less (as a result, the positive peak values to be detected also become small) and accordingly the first threshold value is determined to be small. Meanwhile, if the medium transfer speed is slow, the number of pixels becomes more (as a result, the positive peak values to be detected also become large) and accordingly the first threshold value is determined to be large.

The second threshold value may be any value, as far as the value is determined with any one among the positive peak values included in the vertical projection data according to the number of characters included in the character string. For example, while the positive peak values are disposed in due order starting from the largest one (while a cumulative frequency in a direction from the maximum value to the minimum value is calculated in relation to the histogram of the positive peak values), the second threshold value may be determined with the "n-th" peak value from the largest one, where the "n" is the number of characters included in the character string. Alternatively, the second threshold value may be determined with the "n+●"-th peak value from the largest one (where the value "●" is a optimum value to be determined in consideration of an expected medium transfer speed).

The present invention requires the "prescribed threshold value" simply including the first threshold value and the second threshold value, and detection of the character segmentation positions by using the second threshold value may be carried out at any time. Namely, in the second step of the present invention, the detection of the character segmentation positions by using the second threshold value may be carried out as required, after the same operation by using the first threshold value. Alternatively, both the detecting operations of the character segmentation positions by using the two threshold values may be carried out at all times.

The "characters" referred to in this specification document may include not only commonly-used alphabet letters but also symbol characters, pictographic characters, bar codes, and numeric characters; and the characters may be in any form and size as far as the characters can be recognized visually on the medium.

(2) The method for character string recognition: wherein the second threshold value corresponds to the "n+1"-th value of the peak values where the positive peak values included in the vertical projection data are disposed in due order starting from the largest one and the "n" represents the number of characters included in the character string.

According to at least an embodiment the present invention; the second threshold value described above corresponds to the "n+1"-th value of the peak values where the positive peak values included in the vertical projection data are disposed in due order starting from the largest one and the "n" represents the number of characters included in the character string. In general therefore, no matter how the medium transfer speed is, any small peak values can be detected more efficiently and appropriately so that it becomes possible to prevent a decrease in recognition accuracy for the character string. Particularly in the case of a character (string) recognition apparatus making use of manual transfer; if the "n+1"-th value of the peak values is applied for the second threshold value wherein the "n" represents the number of characters included in the character string, any small peak values can be detected more appropriately no matter how quickly the operator swipes the medium.

(3) The method for character string recognition: wherein the second step uses the second threshold value for detecting the segmentation positions again if any of the segmentation positions cannot be detected by using the first threshold value.

According to at least an embodiment of the present invention; the second step uses the second threshold value for detecting the segmentation positions again if any of the segmentation positions cannot be detected by using the first threshold value. Therefore, detecting the segmentation positions by using the second threshold value is carried out when required. Namely, if the segmentation positions are detected appropriately by using the first threshold value, the same operation using the second threshold value is not carried out. As a result, an operation load (including a load on the memory) of the character string recognition can be reduced. Incidentally, any judging method may be used for recognizing a case where "any of the segmentation positions cannot be detected by using the first threshold value".

(4) The method for character string recognition: wherein the second step uses the second threshold value for detecting the segmentation positions if the first threshold value is smaller than the second threshold value.

According to at least an embodiment of the present invention; the second step described above uses the second threshold value for detecting the segmentation positions if the first threshold value is smaller than the second threshold value. Therefore, the segmentation positions can be detected by using the second threshold value, when required as a result of a simple judgment. Accordingly, it becomes possible to prevent a decrease in recognition accuracy for the character string, while simplifying the character recognition program.

(5) An apparatus for character string recognition may include: means for recognizing a character string placed on a medium by using the method for character string recognition in accordance with any one of items (1) to (4) described above.

According to at least an embodiment of the present invention; it becomes possible to provide the apparatus for character string recognition including means for recognizing a character string placed on a medium by using any one of the methods for character string recognition described above.

Advantageous Effect of the Invention

The method and apparatus for character string recognition according to the present invention enables prevention of a decrease in recognition accuracy for a character string even when image data obtained through picking up the character string includes distortion and/or tilts.

A preferred embodiment of the present invention is described below with reference to the accompanying drawings.

Character String Recognition Apparatus

FIG. 1 is a block diagram showing an electrical structure of a character string recognition apparatus 1 in accordance with an embodiment of the present invention.

In FIG. 1, the character string recognition apparatus 1 includes a contact-type (one-dimensional) image pickup device 11, an image memory 12, a data processing section 13. Then, the data processing section 13 has a line segmenting section 13*a*, a character segmenting section 13*b*, a characteristic extracting section 13*c*, a characteristic comparing section 13*d*, a characteristic dictionary storage section 13*e*, and a similar character discriminating section 13*f*. These sections function as an example of character string recognition means for recognizing a character string placed on a record data carrier 2.

The image pickup device 11 picks up an OCR character string placed on the record data carrier 2, and photoelectrically converts the OCR character string. Then, the image data captured is once saved in the image memory 12. Subsequently the data processing section 13 reads the image data out of the image memory 12, and carries out various operations in the sections described above for consequently recognizing the OCR character string on the record data carrier 2.

The record data carrier 2 may be a common card in accordance with the JIS; for example may be a plastic card that is 86 mm wide, 54 mm high, and 0.76 mm thick; and may be an ID card, a passport, or a driver's license card.

With reference to the character string recognition apparatus 1 including an electrical structure as described above, a general operation flow of a character string recognition method is first explained, and then an operation flow specific to the embodiment of the present invention is described in detail.

Character String Recognition Method

Figure 2:
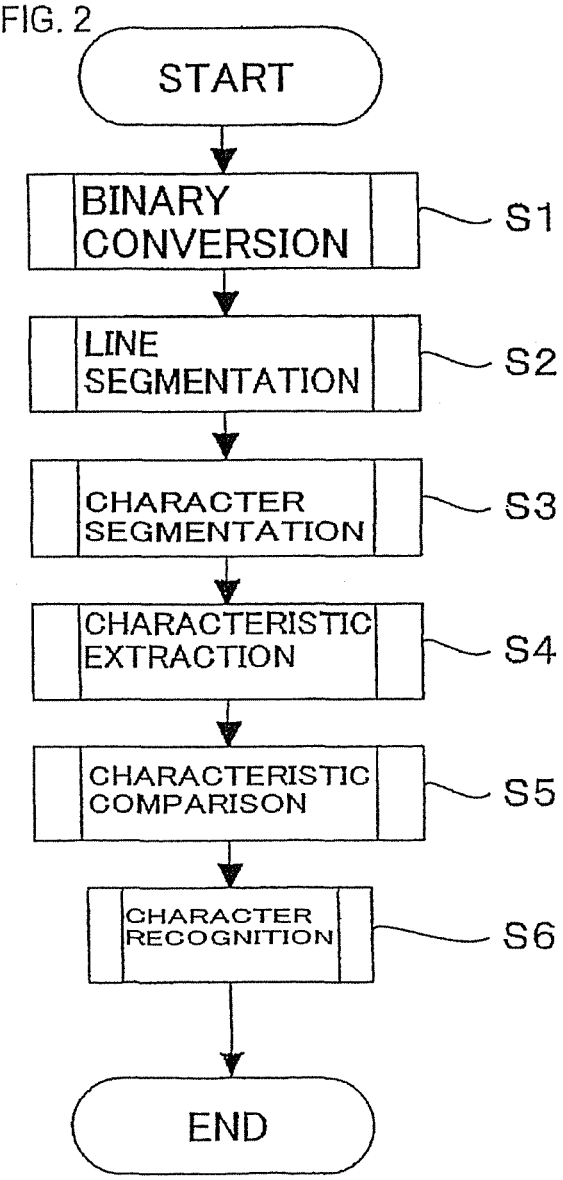
FIG. 2 is a flowchart describing a general operation flow of a character string recognition method in accordance with the embodiment of the present invention.

FIG. 2 is a flowchart describing a general operation flow of a character string recognition method in accordance with the embodiment of the present invention.

As shown in FIG. 2, binary conversion (Step S1) is carried out at first in the character string recognition method in accordance with the embodiment of the present invention. Specifically, the data processing section 13 reads the image data out of the image memory 12. Then, if the image data is of a multi-step gray scale image, the image data is converted into a black-and-white binary image. The image memory 12 may be configured with any device such as RAM, SDRAM, DDRSDRAM, and RDRAM, as far as the device is able to store image data. For the binary conversion, a threshold value is calculated by an appropriate method. Then the black-and-white binary image is used in the following operation steps.

Line segmentation (Step S2) is carried out next. Concretely to describe, the line segmenting section 13*a* of the data processing section 13 projects the binarized character string in a horizontal direction to detect upper and lower edges of the character string. Then, while a center position between the upper and lower edges is recognized as a centerline of the character string, the line segmentation is carried out.

Character segmentation (Step S3) is carried out next. Concretely to describe, the character segmenting section 13b of the data processing section 13 carries out projecting calculation in a vertical direction for image data of each character string detected in Step S2. Then, by using the vertically-projected profile obtained, a space between neighboring two characters is recognized for the character segmentation. More details for the character segmentation are described later in the section of "(Character segmentation)".

After the operation of Step S3 finishes, a circumscribed rectangular area for each character to be recognized is calculated (Coordinate values of the positions on the left, right, top and bottom of the rectangular area).

Then, characteristic extraction is carried out (Step S4) next. Specifically, in the characteristic extracting section 13c of the data processing section 13, the circumscribed rectangular area described above is split into an optional number of sub areas (For example, the rectangular area is split into 5 by 5 areas to make up each sub area). Then, percentage of black pixels in all the pixels of each sub area is calculated, and characteristic vectors including the percentage value as an element are created.

Then, characteristic comparison is carried out (Step S5) next. Concretely to describe, in the characteristic comparing section 13d of the data processing section 13, the characteristic vectors obtained in Step S4 are compared with the standard characteristic vectors calculated beforehand for all characters to be used for the objective medium; and as a result, a candidate character having a highest level of similarity (e.g., a normalized correlation factor) is set for the corresponding character.

The standard characteristic vectors are stored beforehand in the characteristic dictionary storage section 13e. For the characteristic comparison, data of a character having a high level of similarity is read out of the characteristic dictionary storage section 13e.

In the end, character recognition is carried out (Step S6). Concretely to describe, the candidate character set as a result of the characteristic comparison, i.e. Step S5, is recognized for the corresponding character used in the medium. If there exist a plurality of candidate characters each of which is provided with a level of similarity higher than a prescribed level, the character recognition cannot be carried out. Therefore, in such a case, the similar characters are judged in the similar character discriminating section 13f by making use of secondary characteristic properties drawn out of the characteristic vectors.

For example, the sub areas prepared by splitting optionally may be grouped into two regions, i.e. axis-symmetrical right and left halves, to make up sectional characteristic vectors for checking similarity in those sectional characteristic vectors. Likewise, the sub areas may also be grouped into other two regions, i.e. axis-symmetrical upper and lower halves, for the same purpose. Furthermore, similarity may be checked in terms of point symmetry instead of the axis-symmetry in right and left halves or upper and lower halves.

An operation flow specific to the embodiment of the present invention is described below.

Character Segmentation

Figure 3:
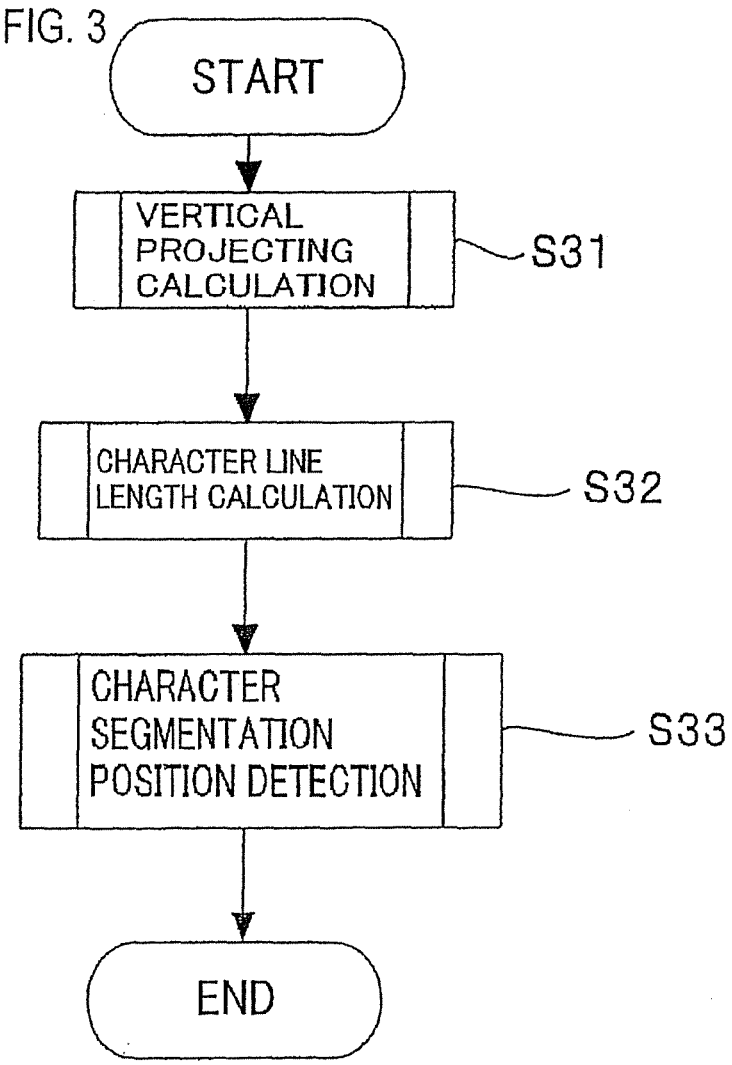
FIG. 3 is a flowchart describing details of the character segmentation (Step S3) shown in the flowchart of FIG. 2.

FIG. 3 is a flowchart describing details of the character segmentation (Step S3) shown in the flowchart of FIG. 2.

Vertical projecting calculation is carried out at first (Step S31). Specifically, while the image data being shifted in the direction of the character string, density projection in a direction perpendicular to the direction of the character string (X-axis) is carried out for calculating vertical projection data. Incidentally, the density projection is a kind of histogram (Concentration distribution diagram), in which the number of pixels being each converted so as to have a density value of "1" or "0" through binary conversion is summed up for each density value, wherein either sum total of white pixels or black pixels may be calculated. Furthermore, the step S31 is an example of a first step for calculating vertical projection of the image data in the direction perpendicular to the direction of the character string, while the image data being shifted in the direction of the character string.

Figure 5:
FIG. 5 shows a result of vertical projection of the image data shown in FIG. 4.

A concrete example of the step S31 is described below. FIG. 4 shows image data obtained by picking up characters printed in an OCR character memory region (Refer to FIG. 1) of the record data carrier 2. Meanwhile FIG. 5 shows a result of vertical projection of the image data shown in FIG. 4.

Then, character line length calculation is carried out next (Step S32). Specifically, the character line length is calculated according to the number of pixels existing between both the ends of the character string detected by using the vertical projection data obtained through the step S31. For example, in the case of the vertical projection data shown in FIG. 5, the character line length is represented by the number of pixels existing between a position "Ps" and another position "Pe".

Incidentally, the number of pixels existing between the position "Ps" and position "Pe" has a close relationship with a speed of swiping the record data carrier 2. Namely, a low swiping speed results in a large number of pixels (to obtain a sufficient resolution), whereas a high swiping speed causes a small number of pixels (not to obtain a sufficient resolution).

Then, character segmentation positions are detected next (Step S33). Specifically, the vertical projection data obtained through the vertical projection includes characters that make up the character string and blank spaces between neighboring two characters; and therefore positions, where the vertical projection data exceeds a prescribed threshold value, are detected as segmentation positions of characters that make up the character string. This work step is further described below in detail with reference to FIG. 6 and FIG. 7. Incidentally, the step S33 is an example of a second step for detecting the positions, where the vertical projection data obtained through the above-described first step exceeds the prescribed threshold value, as the segmentation positions of characters that make up the character string.

Figure 6:
FIG. 6 shows image data of characters (partly) that make up a character string.
Figure 7:
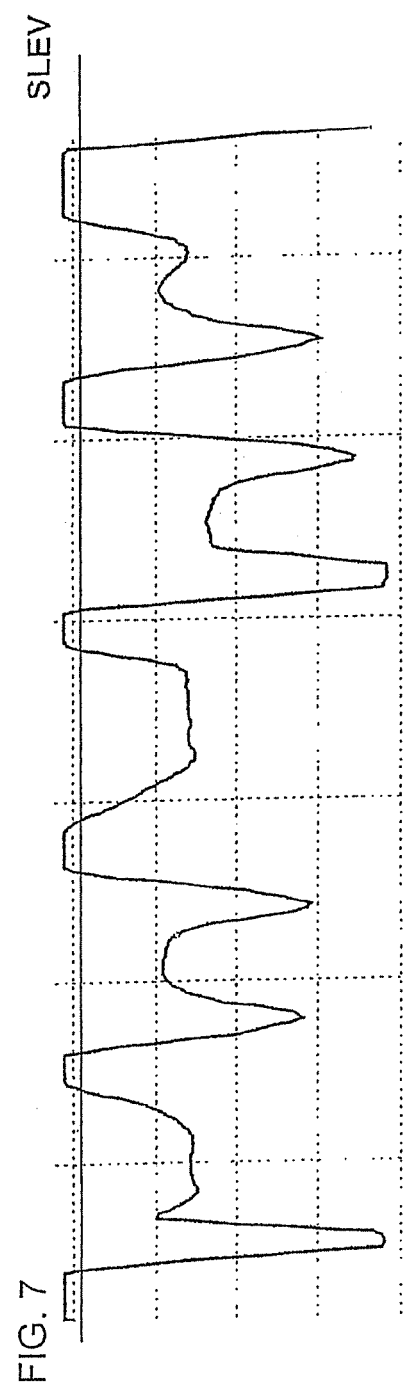
FIG. 7 is vertical projection data (an example) obtained by vertical projection of the image data shown in FIG. 6.

FIG. 6 shows image data of characters (partly) that make up a character string. FIG. 7 is vertical projection data obtained by vertical projection of the image data shown in FIG. 6. Incidentally, FIG. 6 shows the image data of the part from "K" to "C" in FIG. 4.

In FIG. 6 and FIG. 7, a blank space between neighboring two characters corresponds to a part where the curve exceeds the SLEV (threshold). Therefore, in the case of FIG. 7, pixels of the part where the curve exceeds the SLEV (threshold) can be recognized rightly as pixels of a blank space. Incidentally, when a relative transfer speed of the record data carrier 2 is low, the SLEV (threshold) is usually set to be somewhat higher because a blank space between the characters is provided with a sufficient intensity and a enough length, and furthermore it is likely that the vertical projection data involves noise in case of such a low transfer speed.

Figure 8:
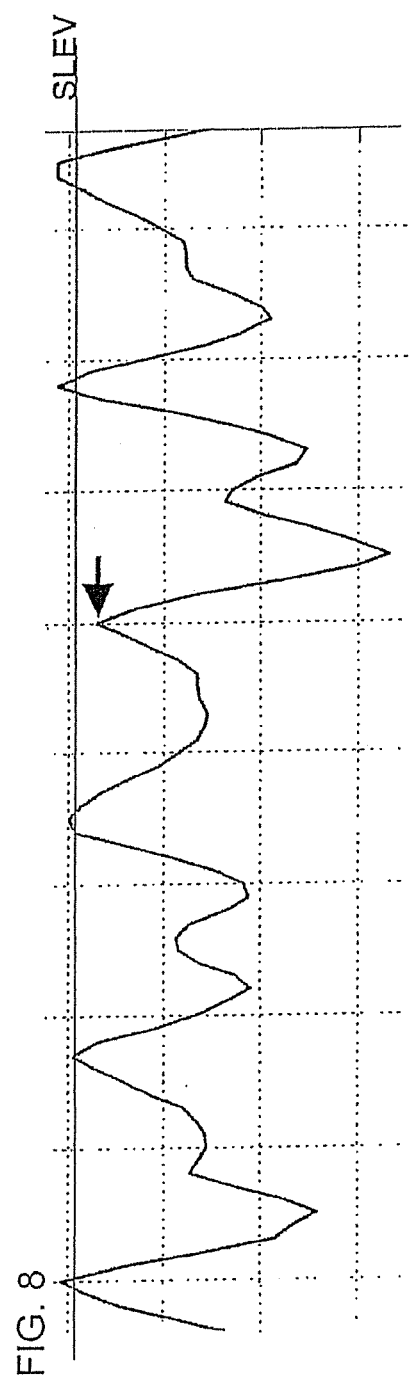
FIG. 8 is vertical projection data (another example) obtained by vertical projection of the image data shown in FIG. 6.

However, when the relative transfer speed of the record data carrier 2 is high, a resolution of the image in the horizontal direction becomes relatively decreased so that an output corresponding to a blank space between neighboring two characters decreases. Specifically, the output becomes as FIG. 8 shows. For example, an output value of an arrowed part shown in FIG. 8 does not exceed the SLEV (threshold), and consequently it is judged that the arrowed part is not a blank space between two characters. However, as shown in FIG. 7, the arrowed part corresponds to a blank space between two characters.

Thus, in the present embodiment, the SLEV (threshold) is defined as a function relating to the relative transfer speed of the record data carrier 2. That is to say; as described above, there exists a correlation between the relative transfer speed of the record data carrier 2 and the number of pixels existing between both ends of a character string detected with the vertical projection data. Therefore, the SLEV (threshold) is shifted in accordance with the number of pixels.

Described below is an example of calculation of the threshold value. In this explanation, "L" represents the number of pixels existing between both the ends (Ps-Pe) of the character string.

Taking it into account that the relative transfer speed may excessively be low in some cases, an upper limit value of the threshold is set as "SLEV=Amax (L≧Lmax)". Contrarily, taking it into account that the relative transfer speed may excessively be high in some cases, a lower limit value of the threshold is set as "SLEV=Amin (L≦Lmin)".

When the length value "L" of the relative transfer speed is greater than "Lmin" but smaller than "Lmax", the SLEV is calculated as: SLEV=Amin+Ad (L−Lmin)/(Lmax−Lmin). The function value "Ad" represents a function that becomes larger as the number of pixels between both the ends of the character string is larger whereas it becomes smaller as the number of pixels between both the ends of the character string is smaller. The function value "Ad" is a function that varies according to the number of pixels between both the ends of the character string, and alternatively it may be a function that varies in accordance with a decreasing rate of an output value for a blank space between neighboring two characters or an incidence rate of noise. Thus, the function value "Ad" is so set as to calculate an optimum threshold value. Furthermore, the "Amin" and "Amax" are so defined as to be able to detect a space between neighboring two characters steadily.

However, the threshold value described with respect to FIG. 7 and FIG. 8 is based on an averaged medium transfer speed, and there is a chance that the threshold value cannot cope with a case that includes a local image alteration and/or a violent change in the transfer speed. For example, when a user swipes a card manually, it is likely that the medium transfer speed is slow at first and fast in the end. Furthermore, as a problem in terms of print quality, a passport with poor print quality for example may include a character that is blurred and swelled. In such a case, a blank space between neighboring two characters becomes short so that a peak does not appear easily in the data curve.

To solve the problem described above, the character string recognition method in accordance with the present embodiment brings in a second threshold value in addition to the above-described threshold value (a first threshold value). To calculate the second threshold value, all positive peak values included in the vertical projection data are detected at first to create a histogram of the positive peak values (to be virtually arranged on a system memory). Then, in the histogram of the positive peak values, a cumulative frequency in a direction from the maximum value to the minimum value is calculated so as to detect a point where the cumulative frequency exceeds the number of characters expected. Then, the peak value at the point is defined as the second threshold value. A concrete example is explained with reference to FIG. 9 through FIG. 11.

Figure 9:
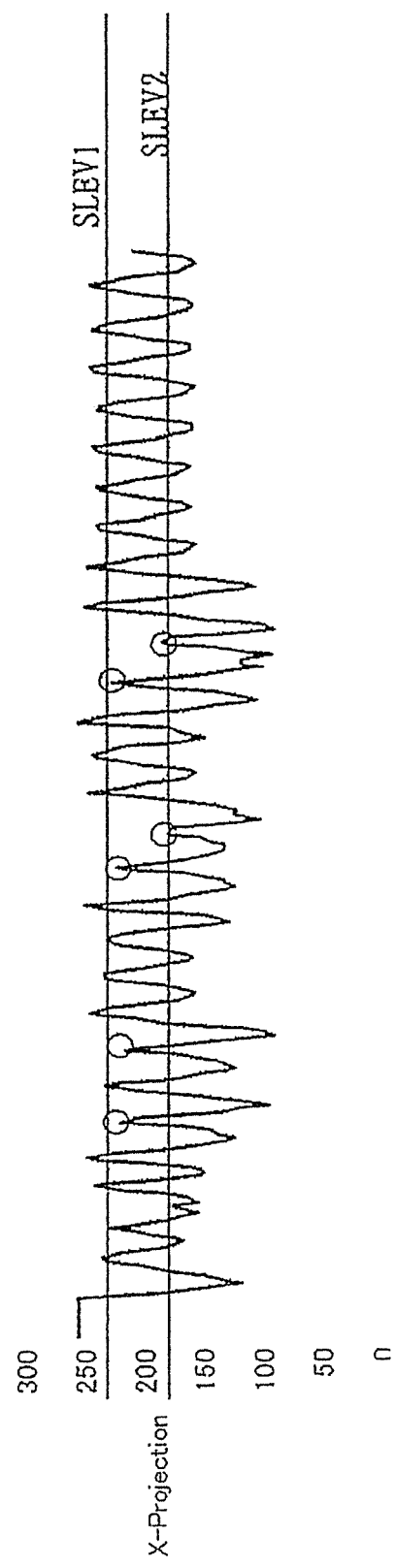
FIG. 9 shows how the first threshold value (SLEV1) and the second threshold value (SLEV2) are defined in vertical projection data (partly).
Figure 10:
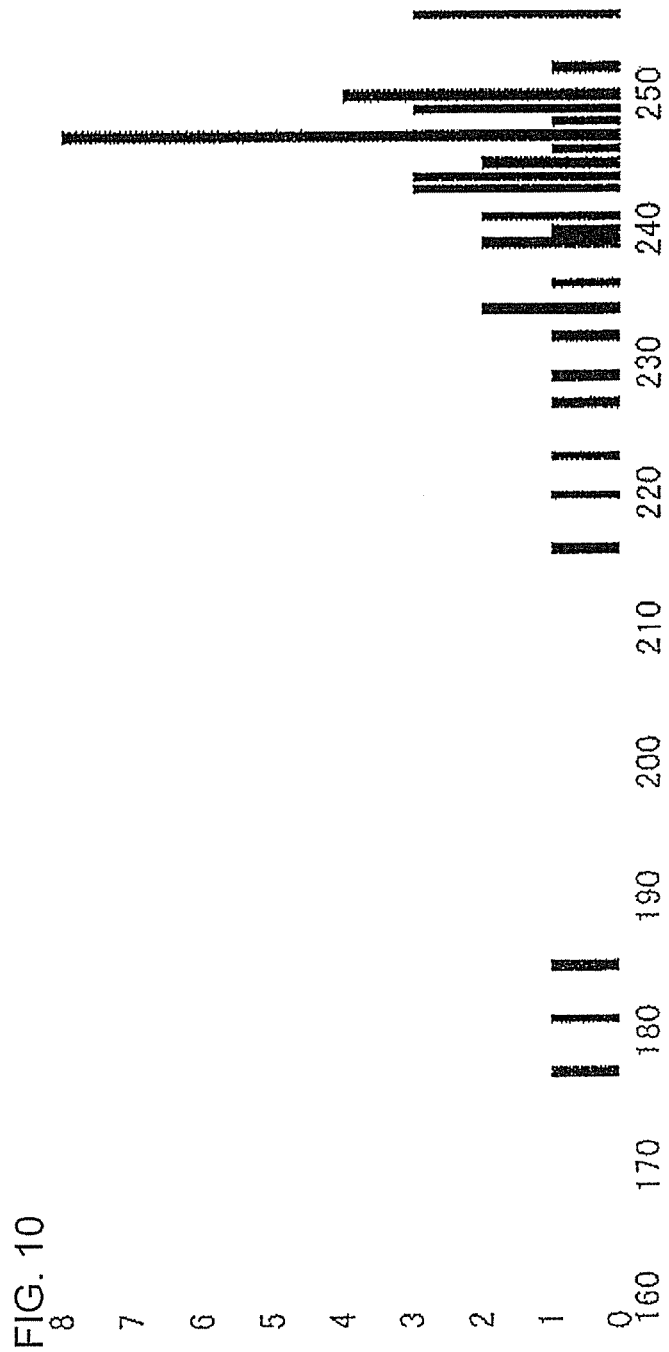
FIG. 10 is a histogram of the positive peak values in the vertical projection data.
Figure 11:
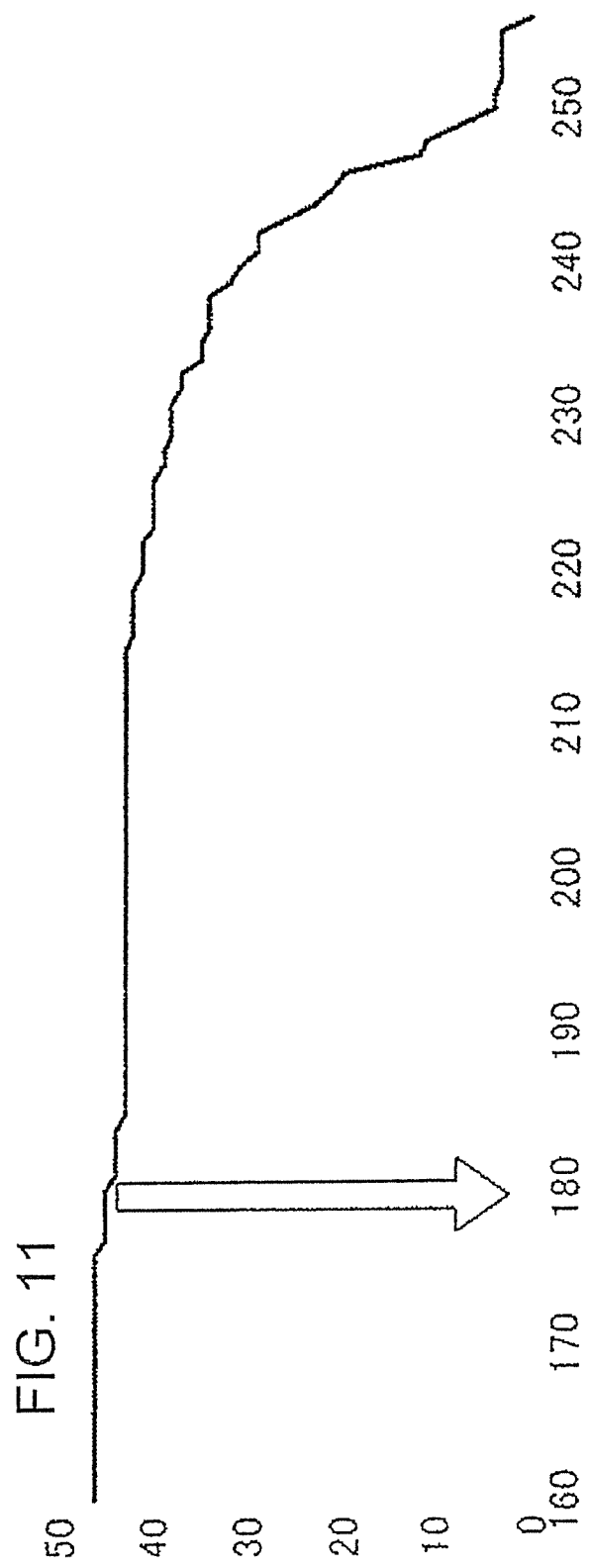
FIG. 11 is a diagram for calculating the cumulative frequency in a direction from the maximum value to the minimum value with reference to the histogram of FIG. 10.

FIG. 9 shows how the first threshold value (SLEV1) and the second threshold value (SLEV2) are defined in vertical projection data (partly). FIG. 10 is a histogram of the positive peak values in the vertical projection data. FIG. 11 is a diagram for calculating the cumulative frequency in a direction from the maximum value to the minimum value with reference to the histogram of FIG. 10.

In FIG. 9, when the positive peak values are decreased due to an extremely high medium transfer speed, using the conventional first threshold value (SLEV1) cannot detect any peak values that are lower than the conventional first threshold value (See the peak positions marked with circle in FIG. 9) so that borders between characters cannot be determined. Thus, in FIG. 9, the second threshold value (SLEV2) that is smaller than the first threshold value (SLEV1) is used for detecting the peak values again so that character segmentation is carried out appropriately.

For a method for defining the second threshold value, as shown in FIG. 10, the positive peak values in the vertical projection data are counted in a histogram wherein the horizontal axis and the vertical axis represent the peak value and the number of times, respectively. According to FIG. 10, most of the peak values are positioned closely around an area of 240-250, while only 3 peak values in total are observed around an area of 180 for example.

In relation to the number of times in the histogram of FIG. 10, the cumulative frequency in a direction from the maximum value to the minimum value results in as FIG. 11 shows. In FIG. 11, the horizontal axis and the vertical axis represent the peak value and the cumulative frequency, respectively. In accordance with FIG. 11 (tracing the line graph of FIG. 11 from the right toward the left end), the cumulative frequency on the positive peak values rapidly increases around an area of 240-250, and afterwards it increases just gently as the peak value becomes smaller.

Assuming that the number of characters to be recognized is 44, the second threshold value is defined with a peak value 180 at which the cumulative frequency exceeds the above value 44, namely the cumulative frequency reaches 45 (i.e., "the number of characters to be recognized"+1) in FIG. 11.

Thus, the second threshold value (SLEV2) shown in FIG. 9 is determined. Incidentally, an operation flow of information data processing for character segmentation by using the first and second threshold values is explained in detail in the section of "(Operation flow of information data processing)" described later.

Subsequently, after the right and left border positions of each character is tentatively determined through the character segmentation processing (Refer to Step S3 in FIG. 2), the character inside the circumscribed rectangular area is calculated as shown in FIG. 12, which shows image data of "<" included in the character string.

In FIG. 12, a vertical projection "PX" and a horizontal projection "PY" are calculated for the purpose of accurately identifying a position of the character "<". Along a curve of the vertical projection "PX", the right and left border positions of the character are detected. That is to say; starting from the left end point of the rectangular area, a scanning operation is carried out along the vertical projection "PX" toward the right. When the level value (Pixel detection) is smaller than the threshold value for the prescribed number of times (e.g., 3 times) continuously at a position, the left edge of the character is defined at the position that satisfies the above condition for the first time. Likewise, starting from the right end point of the rectangular area, another scanning operation is carried out along the vertical projection "PX" toward the left. When the level value is smaller than the threshold value for the prescribed number of times continuously at a position, the right edge of the character is defined at the position that satisfies the above condition for the first time.

Likewise, along a curve of the horizontal projection "PY"; scanning operations are carried out inward from the outside, using the area segmented with the right and left edge positions obtained through the character segmentation processing as a definition area, and starting from the upper and lower end points of the rectangular area. When the level value is smaller than the threshold value for the prescribed number of times continuously at a position, each of the upper and lower edges of the character is defined at the position that satisfies the above condition for the first time.

Thus, each character position within a character string can be specified. Then, according to the specified position, characteristic extraction is carried out (Step S4 in FIG. 2) and characteristic comparison is carried out (Step S5 in FIG. 2) next, and afterward character recognition is carried out (Step S6 in FIG. 2).

Operation Flow of Information Data Processing

Figure 13:
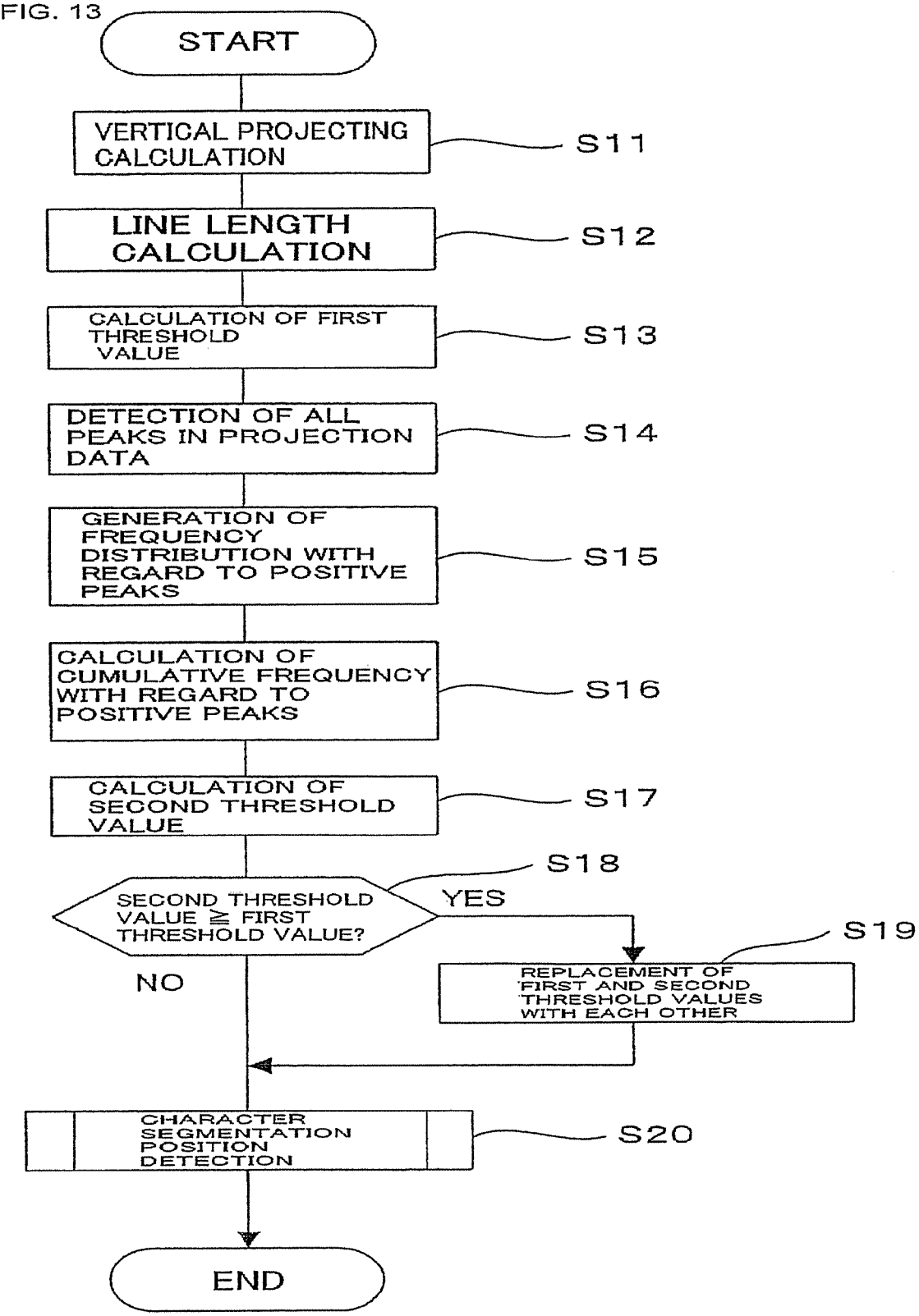
FIG. 13 is a flowchart describing further details of the information data processing shown in FIG. 3.

FIG. 13 is a flowchart describing further details of the information data processing shown in FIG. 3.

In FIG. 13, vertical projecting calculation and line length calculation are carried out (Steps S11 and S12) at first. These calculating operations are the same as Steps S31 and S32 in FIG. 3, and explanation on these operations is omitted.

Then, the first threshold value is calculated (Step S13). Specifically, the first threshold value is determined according to the number of pixels existing between both the ends of the character string, as described above. Subsequently, all the peaks in the projection data are detected (Step S14).

According to the operation result of Step S14, a frequency distribution with regard to the positive peaks (Step S15) is generated, and the cumulative frequency with regard to the positive peaks is calculated (Step S16), and as a result the second threshold value is calculated (Step S17). An example of these operations is already explained by referring to FIG. 10 and FIG. 11.

If the first threshold value is smaller than the second threshold value (Step S18: YES) in the comparison of the first and second threshold values (Step S18), the second threshold value is used by priority. Specifically, the first and second threshold values are replaced with each other (on the memory) (Step S19) so that the second threshold value is prioritized in flowcharts of FIG. 14 and FIG. 15 described later. This operation makes it possible to prevent the excessive number of character border peaks being detected by using the first threshold value. Meanwhile, if the first threshold value is not smaller than the second threshold value (Step S18: NO), the operation of Step S19 is not carried out.

Thus, character segmentation positions may be detected (at first) by using the second threshold value when the first threshold value is smaller than the second threshold value. In operation flows of FIG. 14 and FIG. 15 described later, it is assumed that the first threshold value is not smaller than the second threshold value.

In the end, character segmentation positions are detected (Step S20). Specifically, an operation flow shown later in either FIG. 14 or FIG. 15 may be used.

Figure 14:
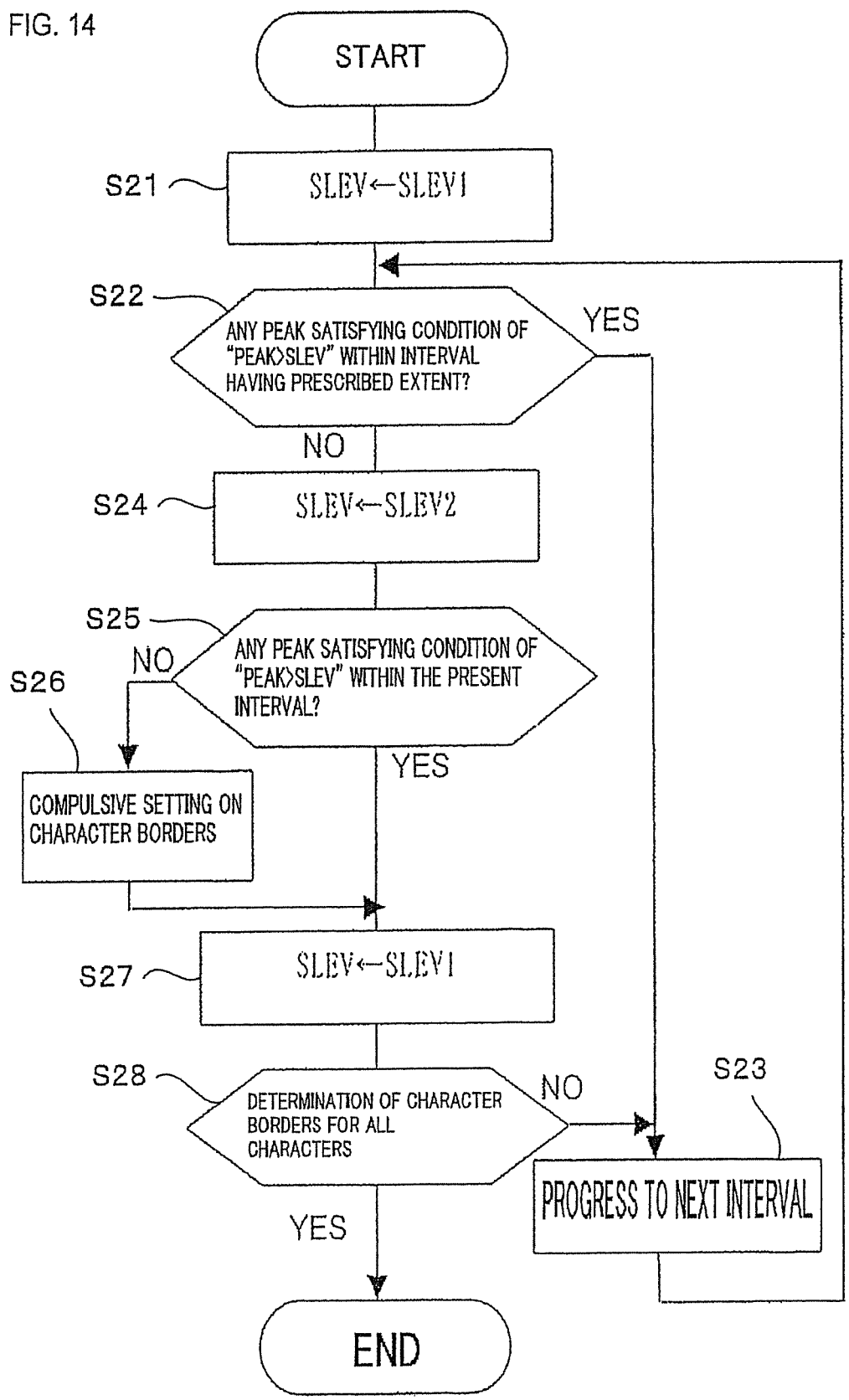
FIG. 14 is a flowchart describing an example of "Detection of character segmentation positions" (Step S20) shown in the flowchart of FIG. 13.

FIG. 14 is a flowchart describing an example of "Detection of character segmentation positions" (Step S20) shown in the flowchart of FIG. 13.

In FIG. 14, the threshold value SLEV1 is assigned to a variable SLEV (an optional parameter) at first (Step S21). Specifically, the first threshold value (SLEV1) calculated in Step S13 shown in FIG. 13 is assigned to the variable SLEV. As described above, practically the second threshold value is assigned to the variable SLEV, when Step S19 shown in FIG. 13 is executed.

Subsequently, it is judged whether or not there exists a positive peak, which satisfies a condition of "PEAK>SLEV", within an interval having a prescribed extent (Step S22). If there exists such a peak (Step S22: YES), it is determined that the interval includes a peak detected. Then, the operation progresses to a next interval (Step S23), and it returns to Step 22.

Meanwhile, if there exists no such a peak (Step S22: NO), the second threshold value SLEV2 is assigned to the variable SLEV (Step S24). Specifically, the second threshold value SLEV2 calculated in Step S17 in FIG. 13 is assigned to the variable SLEV. As described above, practically the first threshold value is assigned to the variable SLEV in this case, when Step S19 shown in FIG. 13 is executed.

Subsequently, it is judged whether or not there exists a positive peak, which satisfies a condition of "PEAK>SLEV", within the interval at the time (Step S25). If there exists such a peak (Step S25: YES), it is determined that the interval includes a peak detected. Meanwhile, if there exists no such a peak (Step S25: NO), a compulsive setting operation on character borders is carried out (Step S26). For example, the compulsive setting operation on character borders includes an interruption of the processing operation.

After Step S25 or Step S26 finishes, the first threshold value SLEV1 is assigned to the variable SLEV (Step S27) to restore the default threshold value SLEV1. Then, it is judged if character borders have been determined for all the characters (Step S28). If not yet (Step S28: NO), the operation progresses to a next interval (Step S23), and it returns to Step 22. If all the character borders have been determined (Step S28: YES), the sub-routine finishes.

Figure 15:
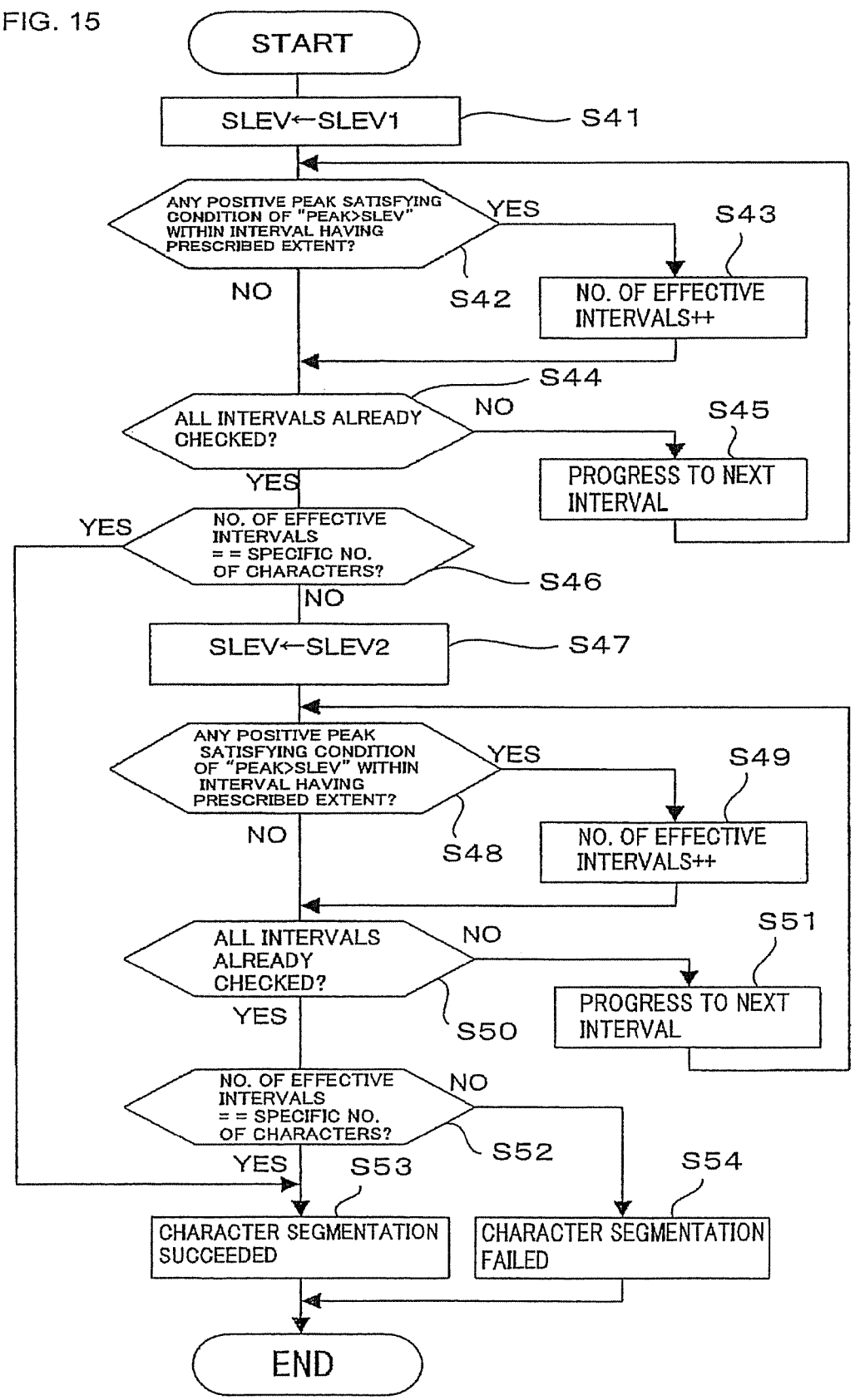
FIG. 15 is a flowchart describing another example of "Detection of character segmentation positions" (Step S20) shown in the flowchart of FIG. 13.

FIG. 15 is a flowchart describing another example of "Detection of character segmentation positions" (Step S20) shown in the flowchart of FIG. 13. Descriptions on the flowchart of FIG. 15 are summarized as follows: In the flowchart of FIG. 14, if peak detection with the first threshold value SLEV1 fails at an interval (Step S22: NO), immediately the second threshold value SLEV2 is used instead for the peak detection (Step S24 and Step S25). Meanwhile, in the flowchart of FIG. 15, regardless of whether the peak detection with the first threshold value SLEV1 fails or not, the peak detection is carried out for all the intervals with the first threshold value SLEV1 at first. Then, if the number of peaks successfully detected with the first threshold value SLEV1 is not equal to the actual number of characters included in the character string, peak detection with the second threshold value SLEV2 is attempted.

In FIG. 15, the threshold value SLEV1 is assigned to a variable SLEV (an optional parameter) at first (Step S41). Then, it is judged whether or not there exists a positive peak, which satisfies a condition of "PEAK>SLEV", within an interval having a prescribed extent (Step S42). If there exists such a positive peak (Step S42: YES), a variable "No. of effective intervals" (parameter) is increased by 1 (Step 43). Meanwhile, if there is no such a positive peak (Step S42: NO), the operation of Step S43 is not carried out.

Subsequently it is judged whether all the intervals have been checked or not (Step S44). If all the intervals have not been checked yet (Step S44: NO), the operation progresses to a next interval (Step S45) and it returns to Step 42. Meanwhile, if all the intervals have already been checked (Step S44: YES), it is judged whether the "No. of effective intervals" described above is equal to the specific number of characters (the number of characters included in the character string) (Step S46). If these two numbers agree with each other (Step S46: YES), it is judged that the character segmentation has succeeded (Step S53) and the sub-routine finishes.

Meanwhile, if these two numbers do not agree with each other, (Step S46: NO), the second threshold value SLEV2 is assigned to the variable SLEV (Step S47). Incidentally, the variable "No. of effective intervals" may be reset at the time (to assign "0" to the variable)

Then, the same operations as Step S32 through Step S35 are carried out subsequently. Namely, it is judged whether or not there exists a positive peak, which satisfies a condition of "PEAK>SLEV", within an interval having a prescribed extent (Step S48). If there exists such a positive peak, a variable "No. of effective intervals" is increased by 1 (Step S49). Subsequently it is judged whether all the intervals have been checked or not (Step S50). If all the intervals have not been checked yet, the operation progresses to a next interval (Step S51) and it returns to Step 48.

Meanwhile, if all the intervals have already been checked, it is judged whether the "No. of effective intervals" described above is equal to the specific number of characters (the number of characters included in the character string) (Step S52). If these two numbers agree with each other (Step S52: YES), it is judged that the character segmentation has succeeded (Step S53). Meanwhile, if these two numbers do not agree with each other, (Step S52: NO), it is judged that the character segmentation has failed (Step S54) and the sub-routine finishes.

Thus, a method of "Detecting character segmentation positions" may be the operation flow shown in either FIG. 14 or FIG. 15. However, the operation flow shown in FIG. 15 requires searching operations through all the intervals by using the first threshold value SLEV1. Therefore, being compared with the operation flow shown in FIG. 15, the operation flow shown in FIG. 14 has an advantage of less operation load (As a result, hardware resources can be used efficiently).

Advantageous Effect of the Embodiment

As described above, in accordance with the character string recognition method relating to the present embodiment; threshold values for character border determination are calculated in two different ways, in operations of character border determination according to a projection data profile in the main scanning direction (Vertical projection data) generated with respect to an image area including a character, for the purpose of detecting character segmentation positions in a character string placed along the medium transfer direction. If the character border determination fails using the first threshold value, the character border determination is carried out again using the second value. According to this disposition, even though using the first threshold value fails in detecting any border peak due to locally uncertain condition of the image, the border peak can be detected rightly by using the second threshold. Therefore, character segmentation can be carried out more precisely so that a decrease in accuracy of character string recognition can be suppressed.

Furthermore, top and end positions of a character string to be recognized are detected so as to set the first threshold value as a function regarding the number of pixels between the two positions. Therefore, the threshold value can be set in accordance with the average transfer speed, and the calculation load is light enough. Consequently, if there is no locally uncertain condition of the image, the character border determination can be carried out economically as well as more precisely.

Moreover, all peaks included in vertical projection data are detected, and then the second threshold value for character border determination is defined according to a histogram of positive peak values out of all the peaks. Therefore, even if there exists locally uncertain condition of the image, the character border determination can be carried out more precisely.

Still further, in the histogram of the peak values described above, a cumulative frequency in a direction from the maximum value to the minimum value is calculated so as to define the second threshold value with a peak value at which the cumulative frequency exceeds the number of characters expected. Therefore, even if there exists locally uncertain condition of the image, the character border determination can be carried out more precisely.

Incidentally, a one-dimensional image pickup device 11 and a linear transfer mechanism are used in this embodiment, but the present invention is not limited to these devices. For example, any combination including a two-dimensional CCD, an area sensor such as a C-MOS imager, and an object support mechanism may be applied. Furthermore, the recognition object may be not only printed type but also handwritten letters. Moreover, the present invention may be applied not only to character recognition but also to recognition of decoding data such as one-dimensional and two-dimensional barcodes.

Industrial Applicability

The method and apparatus for character string recognition in accordance with the present invention are useful for enabling prevention of a decrease in accuracy for character string recognition.

Reference Numerals

1. Character string recognition apparatus
2. Record data carrier
11. Image pickup device
12. Image memory
13. Data processing section
13a. Line segmenting section
13b. Character segmenting section
13c. Characteristic extracting section
13d. Characteristic comparing section
13e. Characteristic dictionary storage section
13f. Similar character discriminating section While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

The invention claimed is:

1. A method for character string recognition by processing image data obtained through picking up a character string placed on a medium comprising:
   a first step of calculating vertical projection data of the image data in a vertical direction perpendicular to a direction of the character string while shifting the image data in the direction of the character string; and
   a second step of detecting positions exceeding a prescribed threshold value in the vertical projection data obtained through the first step described above as segmentation positions of characters included in the character string;

wherein the prescribed threshold value comprises:
a first threshold value determined according to the number of pixels existing between both ends of the character string detected by using the vertical projection data obtained through the first step;
a second threshold being set to an "n+1"-th value of positive peak values of the vertical projection data obtained in the first step, where "n" represents the number of characters included in the character string;
wherein the first threshold value defines a threshold value that becomes larger as the number of pixels between both ends of the character string becomes larger and becomes smaller as the number of pixels between both ends of the character string becomes smaller;
the second threshold value corresponds to the "n+1"-th value of the peak values where the positive peak values included in the vertical projection data are disposed in due order starting from the largest one; and
the second step uses the second threshold value for detecting the segmentation positions if the first threshold value is smaller than the second threshold value.

2. The method for character string recognition according to claim 1:
wherein the second step uses the second threshold value for detecting the segmentation positions again if any of the segmentation positions cannot be detected by using the first threshold value.

3. A method for character string recognition by processing image data obtained through picking up a character string placed on a medium comprising:
a first step of calculating vertical projection data of the image data in a vertical direction perpendicular to a direction of the character string while shifting the image data in the direction of the character string; and
a second step of detecting positions exceeding a prescribed threshold value in the vertical projection data obtained through the first step described above as segmentation positions of characters included in the character string;
wherein the prescribed threshold value comprises:
a first threshold value determined according to the number of pixels existing between both ends of the character string detected by using the vertical projection data obtained through the first step; and
a second threshold being set to an "n+1"-th value of positive peak values of the vertical projection data obtained in the first step, where "n" represents the number of characters included in the character string;
wherein the second step uses the second threshold value for detecting the segmentation positions if the first threshold value is smaller than the second threshold value.

* * * * *